(12) United States Patent
Gray et al.

(10) Patent No.: US 8,376,000 B2
(45) Date of Patent: Feb. 19, 2013

(54) HYDROCARBON VAPOR EMISSION CONTROL

(75) Inventors: John Matthew Gray, Cincinnati, OH (US); Timothy M. Garrison, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1576 days.

(21) Appl. No.: 11/746,787

(22) Filed: May 10, 2007

(65) Prior Publication Data

US 2007/0267089 A1 Nov. 22, 2007

Related U.S. Application Data

(60) Provisional application No. 60/746,933, filed on May 10, 2006.

(51) Int. Cl.
*B65B 1/30* (2006.01)

(52) U.S. Cl. .......... 141/95; 141/192; 141/286; 137/587; 137/588; 137/589; 96/110; 96/113

(58) Field of Classification Search .............. 141/59, 141/95, 286, 192; 137/587–589; 95/143; 96/110–113; 123/519

See application file for complete search history.

(56) References Cited

U.S. PATENT DOCUMENTS

| 3,972,201 A | 8/1976 | Datis |
| 4,166,485 A | 9/1979 | Wokas |
| 4,825,914 A | 5/1989 | Leininger |
| 5,038,838 A * | 8/1991 | Bergamini et al. ............ 141/59 |
| 5,040,577 A | 8/1991 | Pope |
| 5,121,777 A | 6/1992 | Leininger et al. |
| 5,305,807 A * | 4/1994 | Healy ............... 141/59 |
| 5,421,382 A | 6/1995 | Leininger et al. |
| RE35,238 E | 5/1996 | Pope |
| 5,611,841 A * | 3/1997 | Baker et al. .............. 95/50 |
| 5,655,576 A | 8/1997 | Leininger et al. |
| 5,671,785 A | 9/1997 | Andersson |
| 5,755,854 A * | 5/1998 | Nanaji .............. 95/11 |
| 5,782,275 A | 7/1998 | Hartsell, Jr. et al. |
| 5,803,136 A * | 9/1998 | Hartsell, Jr. .............. 141/7 |
| 5,843,212 A | 12/1998 | Nanaji |
| 5,860,457 A | 1/1999 | Andersson |
| 5,992,395 A | 11/1999 | Hartsell, Jr. et al. |
| 6,059,856 A * | 5/2000 | Ohlrogge et al. .......... 95/1 |
| 6,131,621 A | 10/2000 | Garrard |

(Continued)

FOREIGN PATENT DOCUMENTS

| DE | 4410597 | 9/1995 |
| DE | 19813349 | 9/1999 |

OTHER PUBLICATIONS

Frank Wartenhorst (Officer); International Search Report and Written Opinion; Oct. 18, 2007; 14 pages; European Patent Office.

(Continued)

*Primary Examiner* — Timothy L Maust
(74) *Attorney, Agent, or Firm* — Thompson Hine L.L.P.

(57) ABSTRACT

A gasoline vapor treating system includes a single hydrocarbon filter apparatus interconnected to a fuel tank having a range of vapor pressures therein, said filter apparatus receiving hydrocarbon vapors from said tank for one vapor pressure in said fuel tank and said filter apparatus delivering air and hydrocarbon vapor to said tank from said filter responsive to another vapor pressure in said tank lower than said one vapor pressure, said filter operated serially between hydrocarbon loading and hydrocarbon unloading cycles without reference to any other hydrocarbon removal apparatus. A balance nozzle includes a mechanism to mechanically operate a vapor valve therein before the fuel valve is opened.

13 Claims, 7 Drawing Sheets

U.S. PATENT DOCUMENTS

| | | | |
|---|---|---|---|
| 6,174,351 B1 * | 1/2001 | McDowell et al. | 96/4 |
| 6,460,579 B2 | 10/2002 | Nanaji | |
| 6,478,849 B1 * | 11/2002 | Taylor et al. | 95/11 |
| 6,499,516 B2 * | 12/2002 | Pope et al. | 141/59 |
| 6,622,757 B2 | 9/2003 | Hart et al. | |
| 6,644,360 B1 | 11/2003 | Sobota et al. | |
| 6,712,101 B1 | 3/2004 | Nanaji | |
| 6,763,856 B2 * | 7/2004 | Healy | 141/45 |
| 6,805,173 B2 | 10/2004 | Healy | |
| 6,929,038 B2 * | 8/2005 | Nanaji | 141/67 |
| 7,566,358 B2 | 7/2009 | Hart et al. | |
| 2007/0131111 A1 | 6/2007 | Hart et al. | |

OTHER PUBLICATIONS

Annex to Form PCT/ISA/206 Communication Relating to the Results of the Partial International Search mailed Oct. 29, 2007, 7 pages total.

* cited by examiner

| POPULATION | ORVR | NON-ORVR | AIR AND VAPOR TO UST | UST NET | UST NET |
|---|---|---|---|---|---|
| ORVR | GAL/HR | GAL/HR | GAL/HR | GAL/HR | CFH |
| 10% | 27.8 | 250.0 | 202.8 | -75.0 | -10.0 |
| 20% | 55.6 | 222.2 | 183.3 | -94.4 | -12.6 |
| 30% | 83.3 | 194.4 | 163.9 | -113.9 | -15.2 |
| 40% | 111.1 | 166.7 | 144.4 | -133.3 | -17.8 |
| 50% | 138.9 | 138.9 | 125.0 | -152.8 | -20.4 |
| 60% | 166.7 | 111.1 | 105.6 | -172.2 | -23.0 |
| 70% | 194.4 | 83.3 | 86.1 | -191.7 | -25.6 |
| 80% | 222.2 | 55.6 | 66.7 | -211.1 | -28.2 |
| 90% | 250.0 | 27.8 | 47.2 | -230.6 | -30.8 |
| 100% | 277.8 | 0.0 | 27.8 | -250.0 | -33.4 |

FIG. 2

HYDROCARBON VAPOR EMISSION CONTROL

PRIORITY CLAIM

Applicant claims the benefit of the filing date of May 10, 2006 of U.S. provisional patent application Ser. No. 60/746,933.

FIELD OF THE INVENTION

This invention relates to reduction of hydrocarbon vapor emissions attendant fueling of vehicles with hydrocarbon fuel and more particularly to methods and apparatus for filtering hydrocarbon vapor from fueling system emissions and retaining hydrocarbon vapor within a fueling system.

BACKGROUND OF THE INVENTION

It has been increasingly important to reduce or eliminate emission of hydrocarbon vapors attendant the fueling of vehicles with hydrocarbon fuels, such as liquid gasoline. Certain jurisdictions such as California regulate hydrocarbon emissions to ever decreasing minimums In order to meet various even more restrictive standards, various methods and devices have been proposed. One such prior system includes the use of a vapor recover nozzle such as an assist nozzle associated with a dispenser, an underground storage tank (UST) and a vacuum pump for pumping captured vapors back to the UST. Another system includes the use of a vapor recover nozzle such as a "balance" nozzle associated with a dispenser and a UST where captured vapors passively flow back to the UST. A yet further system includes a vapor recovery nozzle, a dispenser and/or UST, together with dual hydrocarbon filtering canisters operating in a parallel process mode. One canister operates to filter out hydrocarbon vapor emissions from the UST while the other canister is subjected to a reverse air flow to clean or "unload" captured hydrocarbon fractions in it, previously filtered out of a stream of air and vapor discharging from the UST. The canister functions are reversed or cycled as desired for alternate filtering and cleaning, opposite to each other.

It is desired to provide less costly, less complex emissions reducing or eliminating apparatus and methods without the use of vacuum assist at either the fuel nozzle or at any hydrocarbon filter.

Accordingly, it is one objective of the invention to provide improved methods and apparatus for capturing and retaining hydrocarbon emissions resulting from a fueling process from an underground storage tank.

A further objective of the invention has been to provide an improved hydrocarbon filter apparatus and process for filtering hydrocarbons from vapor within an underground storage tank.

A yet further objective of the invention has been to provide passive or balanced apparatus and methods for filtering hydrocarbons from emissions from an underground storage tank of hydrocarbon fuel and for passively cleaning or unloading a hydrocarbon filter without use of any vacuum assist.

A further objective of the invention has been to provide apparatus and processes to filter hydrocarbon emissions resulting from a fueling process with less costly and less complex apparatus and processes than in current use.

SUMMARY OF THE INVENTION

To these ends, the invention, in one embodiment, contemplates an underground storage tank (UST) of fuel operably interconnected to a dispenser and a vapor recovery nozzle of any suitable configuration for dispensing liquid fuel, such as gasoline, from the UST into a fuel consuming vehicle. While fuel is being dispensed, liquid fuel is flowing out of the UST, decreasing vapor pressure above the fuel in the tank. The UST is operably connected to atmosphere through a valved hydrocarbon filtering canister.

Operationally, according to the invention, while fuel is being dispensed, the resulting decrease in vapor pressure in the UST to a level below about −2.0 inches water column and less is operable to cause a valve to open to draw atmosphere through the canister and toward the UST to clean or unload hydrocarbon fractions previously adsorbed in the canister. When fuel dispensing ceases, and according to the invention, vapor pressure increases, in the UST to a level above about +0.20 inches water column, the same valve opens and hydrocarbon vapor is transferred through the canister toward its vent, to atmosphere, the hydrocarbon fractions being adsorbed in the canister and removed from the discharging vapor.

Only a single canister is required, and the apparatus and methods perform without any vacuum assist. The single filter canister is "loaded" during periods wherein fuel is not being dispensed and is cleaned or unloaded during periods where fuel is being dispensed, the entire system being driven passively primarily as a function of vapor pressure in the UST. Thus, according to the invention, a single canister is operationally cycled in serial fashion and not in parallel or in tandem with any other hydrocarbon filter.

Pressure sensors, hydrocarbon sensors and one or more valves on one or more sides of the filter canister are operationally interconnected through a programmable control to accomplish the operational cycle described above, and as will be described in more detail.

As compared to known systems, the invention provides for hydrocarbon emission control more cheaply and with less complexity than prior known systems, and without the need for any active vacuum or vapor assist.

These and other objectives and advantages of a preferred embodiment of the invention will become readily apparent from the following detailed written description and from the drawings, in which:

BRIEF DESCRIPTION OF THE DRAWINGS

FIG. 2 is a table illustrating the parameters of a fueling operations for mixes of vehicle types;

DETAILED DESCRIPTION

Figure 1:
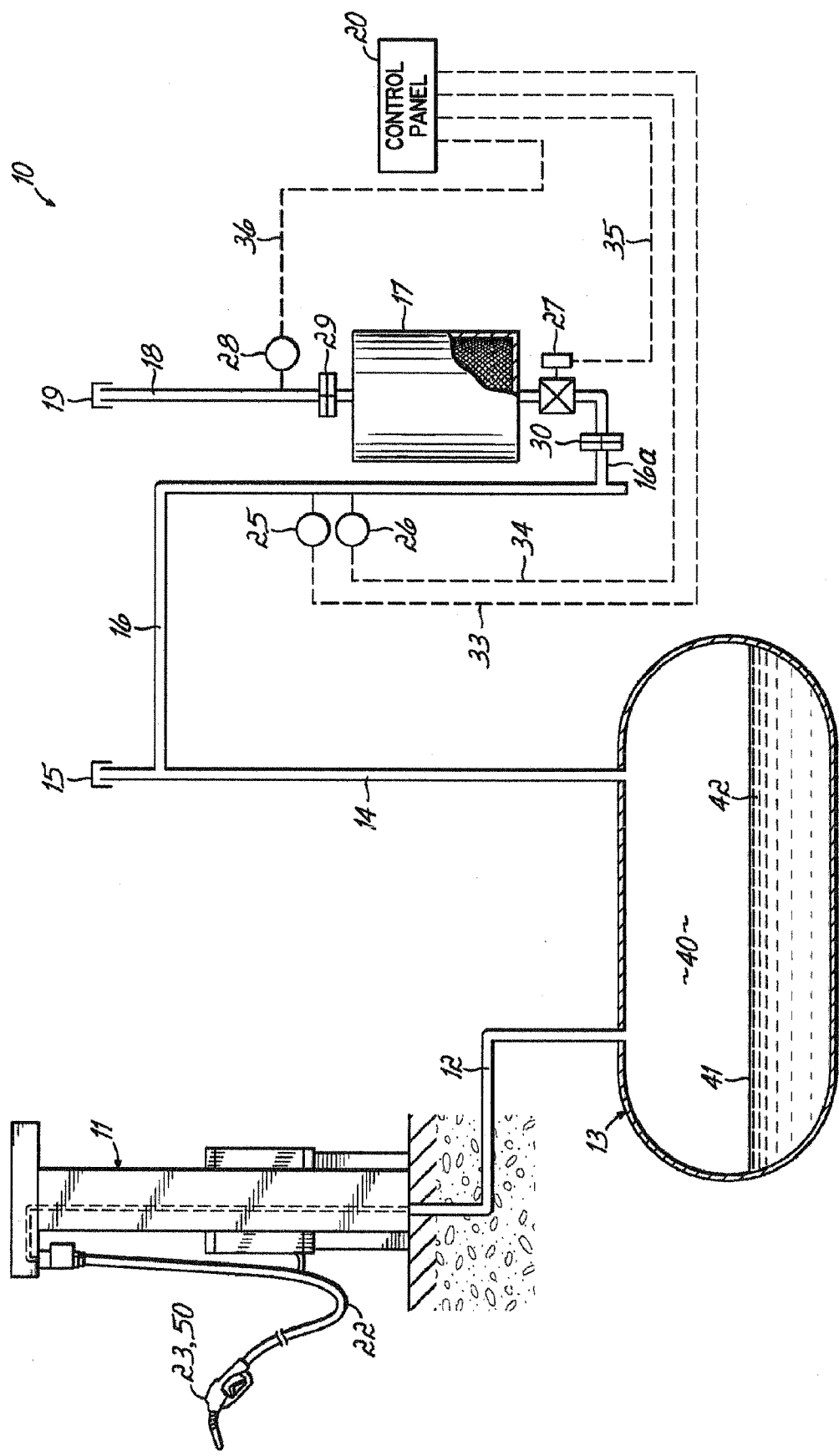
FIG. 1 is a schematic drawing illustrating components of the invention and the function and process of certain components thereof.

Turning now to the Figures, the invention is schematically illustrated in FIG. 1 and comprises a system 10 including a fuel or gasoline dispenser 11 (preferably above ground), an underground storage tank 13 for fuel/gasoline and referred to herein as the "UST" 13, a gas supply line and vapor return line 12, a vent line, a vapor vent or passage 14, a pressure relief vent cap 15, a vapor passage or conduit 16, a vapor passage or conduit 16A, a hydrocarbon adsorbing filter canister 17, a vapor vent line 18 with a pressure relieve or open cap 19 and a control 20. Also provided as shown are high pressure sensor 25, low pressure sensor 26, solenoid operated valve 27, hydrocarbon sensor 28 and optional flow restrictions 29, 30 in lines 16A, 18, respectively.

It will be noted that filter 17 is a filter of any suitable manufacture for filtering hydrocarbons out of the vapor transferred from UST 13 to filter 17. Preferably, the filter media, mass and flow characteristics are selected as functions of the volume of anticipated hydrocarbon vapor to be filtered. Such filters are preferably in the form of a canister with couplings, or ends suitable for attachment to lines or conduits 16A and 18 as illustrated. Media may comprise activated carton or any other suitable form of hydrocarbon adsorptive media.

Control 20 comprises a control panel, together with such programmable electronic controls of any type as are well-known in the control industry, functioning according to the invention as will be described.

Sensor 25 is pre-set to sense a predetermined higher, pressure in line 16 and is capable of sending a signal through line 33 to control 20 indicating a pressure level in line 16 of about +0.20 inches or higher. Sensor 26 is pre-set to sense a predetermined lower pressure in line 16 and is capable of sending a signal through line 34 to control 20 when pressure in line 16 reaches −2.0 inches of water column or lower. Sensor 25 can be set to indicate pressures of up to +0.50 inches of water column and higher, while sensor 26 can be set to indicate lower pressures of −2.5 inches of water column or lower. Lines 33, 34 are control input lines to control 20. Line 35 is an output line from control 20 to solenoid valve 27. Solenoid valve 27 is operated to open vapor passage 16A when the sensor 25 signals control 20 in the presence of a high pressure of about +0.20 inches of water column, preferably, or alternatively, somewhat higher up to +0.50 water column. Solenoid valve 27 is also operated to open when sensor 26 signals a lower pressure of preferably about −2.0 inches of water column in passage 16 or alternatively somewhat lower pressure of about −2.5 inches water column.

Accordingly, valve 27 opens line 16A to pass vapor between UST 13 and filter 17 when vapor pressures in line 16 exceed about +0.20 inches water column or when vapor pressures in line 16 are less than about −2.0 inches water column. For pressures between about +0.20 inches water column and about −2.0 inches water column, valve 27 is closed. Other pre-sets or pressures may be used but these pressures are preferred.

It will be appreciated the pressures noted are relative to ambient pressure of about 0.0 inches water column. It will also be appreciated that pressures in vapor passage 16 are approximately equal to vapor pressure in the vapor area 40 above surface 41 of liquid fuel such as gasoline 42 in UST 13.

Several other structural features of system 10 are noted prior to a detailed description of operation.

Hydrocarbon sensor 28 is operatively coupled to control 20 via a line 36 input to control 20.

Pressure relief of vent cap 15 on line 16 is set to crack open at about −8.0 inches of water column pressure or about +3.0 inches of water column pressure. In this way, dangerous over pressures or vacuums are relieved and avoided.

Pressure or vacuum relief cap 19 over line 18 may be open for passage of gases into or out of passage 18 at any pressure or it too may be set to pass gases in either direction in response to a preset pressure. Preferably, cap 19 is an open rain or weather guard cap.

Finally, it will be appreciated that line 12 operably connects dispenser 11 to UST 13 and in any form of suitable conduit capable of transferring liquid gas 42 from UST 13 to dispenser 11 and of transferring vapor from dispenser 11 to UST 13. Passage 12 may have a gas passage extending to the bottom of UST 13, and a vapor outlet oriented proximate the upper interior of UST 13.

Dispenser 11 has an outlet hose 22 operably connected to a fuel dispensing nozzle 23. Nozzle 23 is any suitable fuel dispensing/vapor recovery nozzle capable of transferring fuel to a vehicle, for example, from UST 13 and from capturing vapors attendant such transfer for return to UST 13 through hose 22, dispenser 11 and conduit 12.

While a "vapor assist"-type nozzle of any well-known manufacture might be adapted with intelligence for use in system 10, it is preferred to use a "balance"-type nozzle of any suitable manufacture. Examples of "balance"-type nozzles 23 which could be used are as follows: Nozzle Model 11VF available from OPW Fueling Components of 9393 Princeton Glendale Road, Hamilton, Ohio 45011. Nozzle Model V available from Husky Corporation of 2325 Husky Way, Pacific, Mo., 63069; or Nozzle Model A4005 or A4015 available from Emco Wheaton of 2300 Industrial Park Drive, Wilson, N.C., 27893.

Moreover, such vapor recovery balance nozzles and components thereof are described in U.S. Pat. Nos. 5,665,576; 5,421,382; 5,121,777 and 4,825,914, all of which are expressly incorporated herein by reference as if fully set forth here.

Also, and while the nozzles in the following patents are primarily for use in vapor assisted systems, U.S. Pat. Nos. 6,851,628; 6,951,229 and 7,134,580 showing "assist" type nozzles are also incorporated herein by reference as if fully set forth herein. The balance nozzle further described herein is similar to the assist nozzles in these latter patents, excepting for the lack of an "assist" mechanism, the mechanical vapor valve, the stem seal and stem shoulder, and the secondary shut-off mechanism described herein.

In this regard, a preferred "balance"-type nozzle generally comprises a nozzle for dispensing gasoline and for capturing and transferring vapors through a coaxial hose back from the vicinity of a vehicle tank outlet to the dispenser 11 and UST 13, as a function of vapor pressure and without extraneous vacuum assist. Such nozzles in the past have typically included a vapor valve opened by the action of a sealing boot engaging the gasoline fill tube of a vehicle.

This has proven to be quite unreliable in generating a substantially tight vapor seal when the nozzle is not in use. This can occur since a bellows actuated vapor valve can be activated at any time just by having the bellows compressed, by hand, or by misplacement in the dispenser nozzle boot. Without this substantially tight vapor seal during non-dispensing periods, if the storage tank is in vacuum, uncontrolled air is drawn in, encouraging gasoline evaporation and emissions, or if the storage tank is in pressure, without the tight vapor seal, uncontrolled and unmonitored emissions are continuously occurring. In contrast, and as described herein, a balance valve useful with system 10 contains a lever actuated vapor valve which only opens when liquid gasoline is being dispensed.

In any event, the balance nozzles which may be useful with this invention typically include a boot for sealing to the vehicle for effective capture of hydrocarbon vapor.

Nozzle

Figure 5:
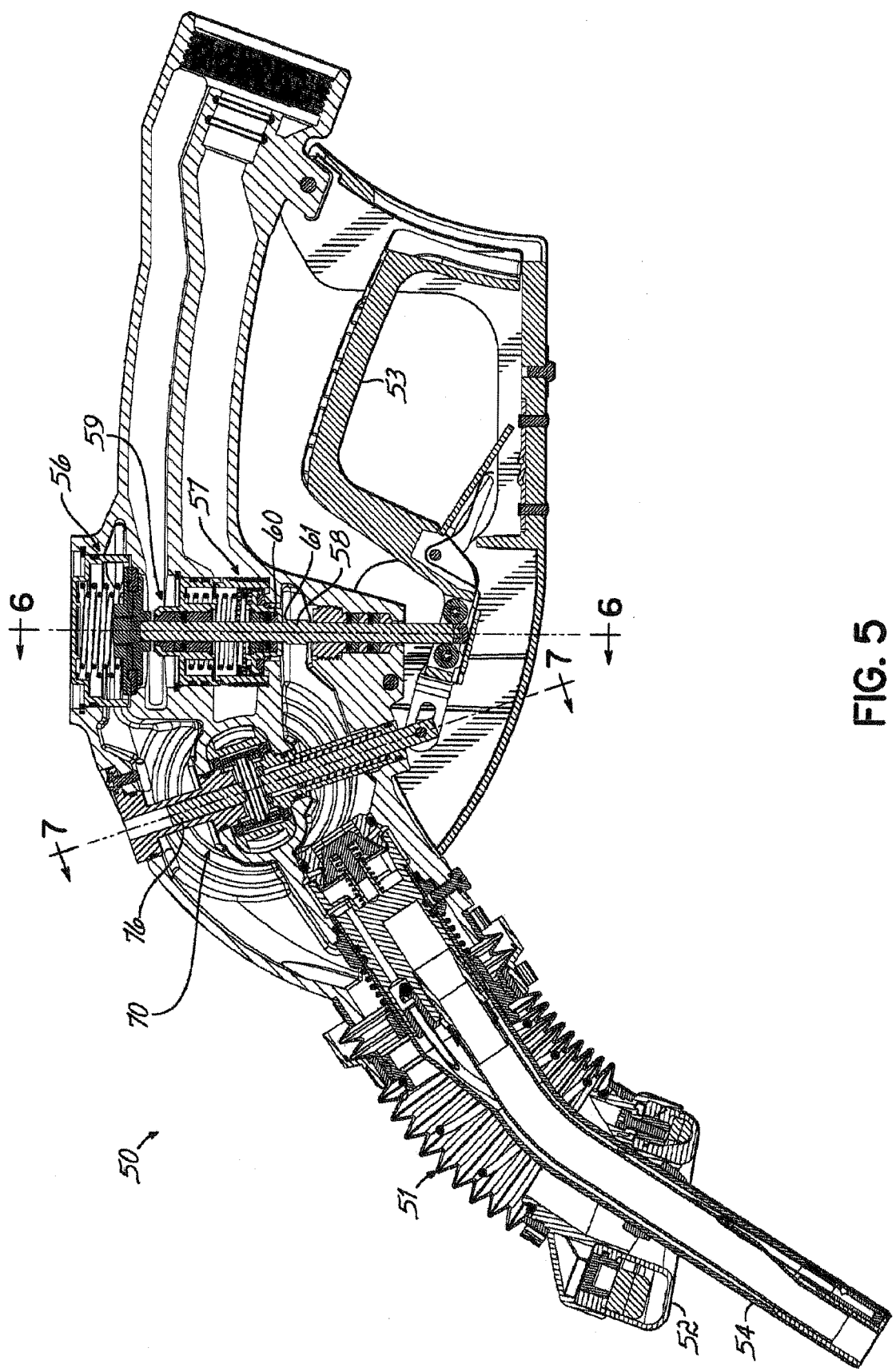
FIG. 5 is a cross-sectional view of components of one form of balance nozzle useful with the system of the invention.
Figure 6:
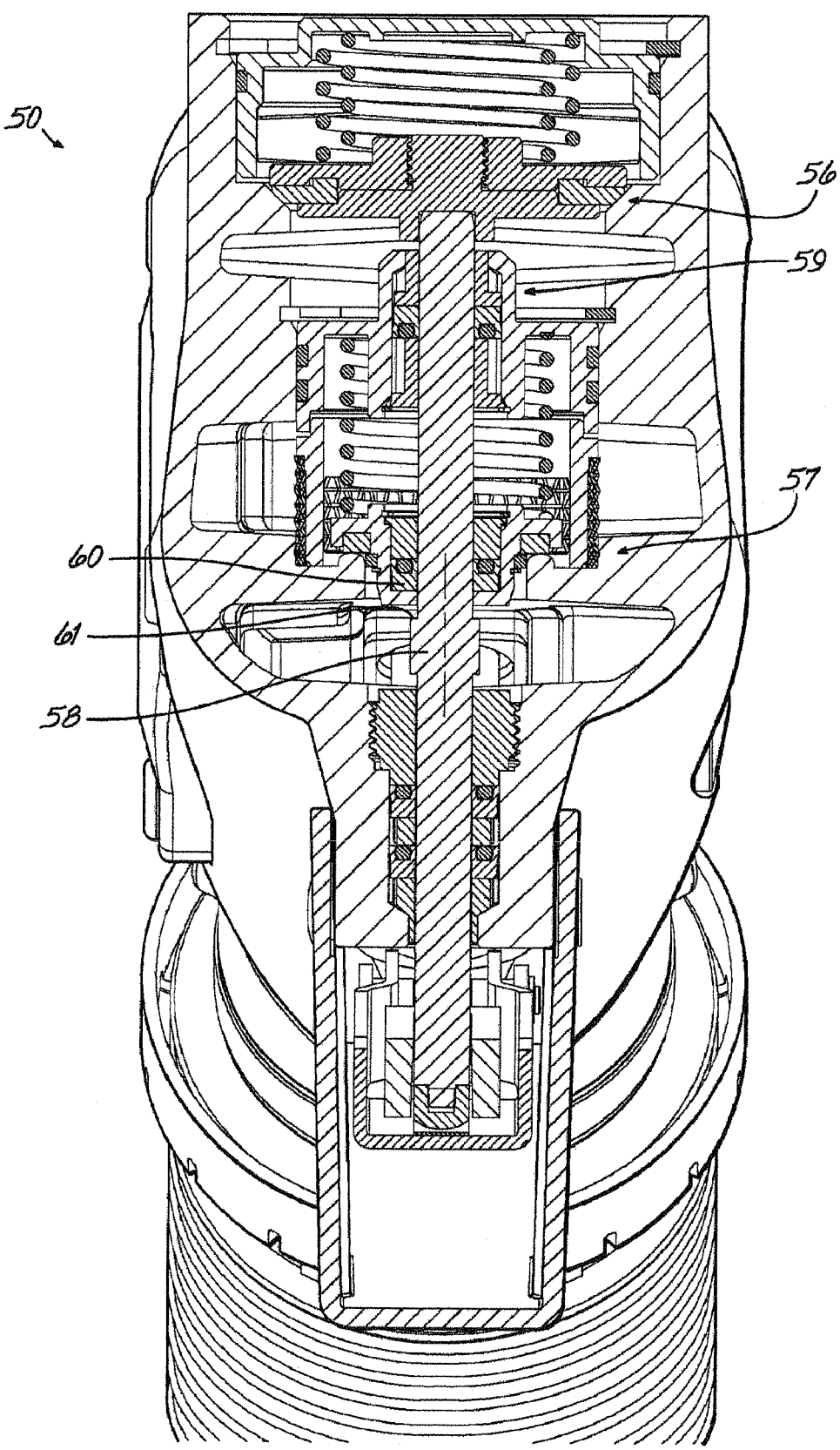
FIG. 6 is a cross-sectional view taken along lines 6-6 of FIG. 5 and illustrating a dynamic seal and step stop of the nozzle.

Accordingly, FIG. 5 illustrates one form of modified balance nozzle 50 (like nozzle 23) which may be useful with system 10. Nozzle 50 includes a collapsible bellows 51 which has a forward face 52 for sealing with a gasoline filler tube mouth during refueling. Nozzle 50 has an interlock (not part of this invention) which disables the gas valve actuating lever 53 until bellows 51 is collapsed against a vehicle filler tube with spout 54 therein.

Nozzle 50 has a vapor valve 56 mounted coaxially with gas valve 57 for movement therewith. However, upon actuation of lever 53, vapor valve 56 is cracked open prior to opening of gas valve 57.

The mechanical vapor valve 56 starts to open with the main lever 53, before the liquid valve 57 opens. This action allows the mechanical vapor valve 56 to simulate the operation of a traditional balanced nozzle that has a vapor valve in the spout/bellows area.

The "boot-actuated" vapor valve on a traditional balanced nozzle will open when the nozzle is inserted into the fill pipe of the vehicle. However, as stated above, these types of vapor valves are also prone to leakage when they are hung up in the dispenser boot. There is a spring loaded flapper switch located in the dispenser boot that electronically deactivates the dispenser when the nozzle is hung up and any pressure on the bellows by its flapper switch could potentially open the valve and cause a leak in the system. A mechanical valve, such as valve 56 in nozzle 50 herein, is immune to this problem.

Mechanical vapor valves have been used in vacuum assist nozzles such as shown in several of the noted patents. Assist nozzle modules are available from OPW Fueling Components of 9393 Princeton Glendale Road, Hamilton, Ohio 45011, however, these vapor valves typically do not open before the liquid valve.

Because a vacuum assist nozzle inherently has a much higher pressure drop through the vapor path (primarily due to the hose design), they therefore need a vacuum pump to "assist" the gasoline vapors through the vapor recover system. There is no need for the vapor valve to be open prior to the dispensing fuel, since the vacuum pump will overcome the higher back pressure of a partially closed valve.

A balanced system has a much lower pressure drop through the vapor path and does not rely on a vacuum pump to pull the vapors through the system. Instead, the nozzle creates a tight seal on the vehicle fill pipe and when fuel is dispensed into the tank, the vapors are forced through the vapor path of the nozzle and pushed into the hose. If fuel was allowed to be dispensed (at a slow rate) with the vapor valve closed, then the vapor path could become pressurized and simulate a blockage.

Figure 7:
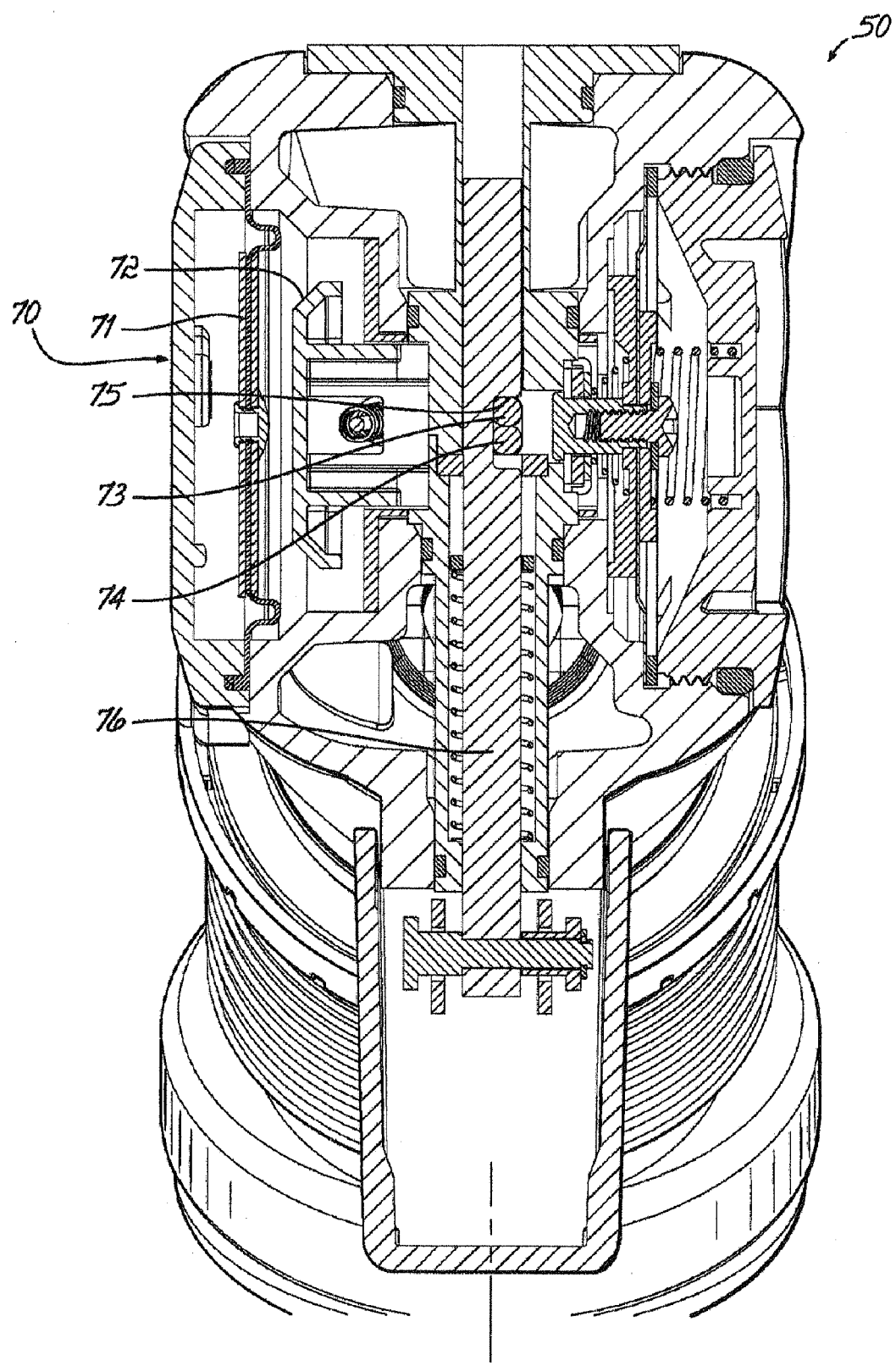
FIG. 7 is a cross-sectional view taken along lines 7-7 of FIG. 5 and showing the secondary shut-off apparatus of the nozzle.

On the balanced nozzle 50, there is a secondary shutoff mechanism 70 (FIG. 7) located opposite the primary shutoff mechanism that will not allow the nozzle to operate if a blockage is detected in the vapor path of the nozzle or the balanced hose. A pressurized vapor path can create a dangerous condition by causing fuel to be ejected from the vehicle fill pipe when the nozzle is retracted from the vehicle. The secondary shut off mechanism is not required on assist nozzles.

More particularly, the space to the left of a diaphragm 71 (FIG. 7) is connected to the vapor path of the nozzle through a small drilled hole (not shown), between the vapor valve and the inlet (hose end). If a blockage occurs due to liquid in the vapor path of the hose 22 (FIG. 1), pressure will build up in the vapor path of the nozzle 23, 50 (FIG. 1) while gasoline is being dispensed (presuming there is a tight seal of bellows face 52 (FIG. 5) on the vehicle fill pipe face). This pressure will act on the diaphragm and displace it to the right, which will make contact with the push link 72 and ultimately push the latching rollers 73, 74 out of the notch 75 in the latch stem 76. This action will close the main valve and not allow the flow of gasoline through the nozzle.

The main stem 58 of nozzle 50 travels through the main valve sub-assembly at 59. A dynamic seal 60 prevents leakage through the main valve section 57 around stem 58. This dynamic seal 60 is accomplished with an elastomer lip seal or by any other suitable sealing expedient.

Finally, a stop (61) on the main stem controls the pre-travel of the vapor valve in the following manner.

In other nozzles, the mail fuel valve is connected directly to the main stem. When the operating lever is depressed, the stem moves upward and immediately opens the main valve. In contrast, in nozzle 50, when the lever is depressed, the main stem 58 moves upward, but the vapor valve 56 opens first. There is a step 61 on the stem 58 that will only then start to open the main valve 57 after the vapor valve 56 is open slightly.

Because the main stem 58 goes through the main valve 57 to open the vapor valve first, seal 60 is used with the main valve 57 itself. The main valve 57 sub-assembly actually floats on the main stem 58 when it is in the closed position.

Operation

Operation of system 10 generally comprises three basic conditions:

a. Valve 27 is closed, and no vapor or air is transferred through conduits 16, 16A, 18;

b. When the gasoline storage tank (UST 13) achieves a pressure slightly above local atmospheric, such as about +0.20 inches water column, this pressure is sensed by the pressure sensor 25 which sends an electrical signal to the control panel, which in turn opens the valve 27 allowing gasoline vapor emissions to enter the canister 17. Hydrocarbon vapor is adsorbed in filter 17 and the filter is "loaded" with hydrocarbon, thus cleaning hydrocarbon from the vapor emitted through passage 18.

c. When the gasoline storage tank (UST 13) achieves a pressure slightly below local atmospheric, i.e. about −2.0 inches water column, this pressure is sensed by the pressure sensor 26 which sends an electrical signal to the control panel 20 which in turn opens the valve 27, allowing atmospheric air to enter the canister filter 17 through cap 19 and vent conduit 18. Air travels through canister 17 in an upstream direction to UST 13. Hydrocarbon is released by the adsorbent material of filter 17 and joins the air in returning to the gasoline storage tank (UST 13).

In a yet fourth condition, where positive vapor pressures exceed about +3.0 inches or negative vapor pressures are less than about −8.0 inches, relief valve cap 15 opens to prevent damage, gas spill or other aberrations to UST 13, or other components of system 10, even though this may result in a hydrocarbon leak.

There are generally two types of vehicles which may be fueled by the invention including system 10. These are vehicles with Onboard Refueling Vapor Recovery Systems (ORVR) and vehicles without such systems. The table of FIG. 2 illustrates the comparison of fueling a population of ORVR vehicles from 10% to 100% of both classes of vehicles fueled, and is self-explanatory. FIG. 2 illustrates a facility dispensing throughput of about 5000 gallons per day (18 hours) at about 278 gallons per hour. The ratio of the volume of vapor and air collected from the vehicles and returned to the UST 13 to the volume of gasoline dispensed from the UST 13 to the vehicle (i.e. V/L) is about 0.10 for ORVR vehicles and about 0.80 for non-ORVR vehicles.

The table of FIG. 2 illustrates the overall performance of system 10 according to the invention within these parameters and illustrates the typical volumes of gasoline and vapors handled in system 10 in a typical dispensing day.

During normal customer dispensing, with any population of ORVR vehicles, the volume of air/vapor returned to the gasoline storage tank from the vehicle/nozzle interface is less than the volume of liquid gasoline leaving the storage tank 13. FIG. 2 shows the relationship between the vapor collected at the nozzle and the net negative volume in the storage tank in the presence of ORVR vehicle fueling; this net negative volume results in a reduction of storage tank pressure during dispensing into vehicles.

Figure 3:
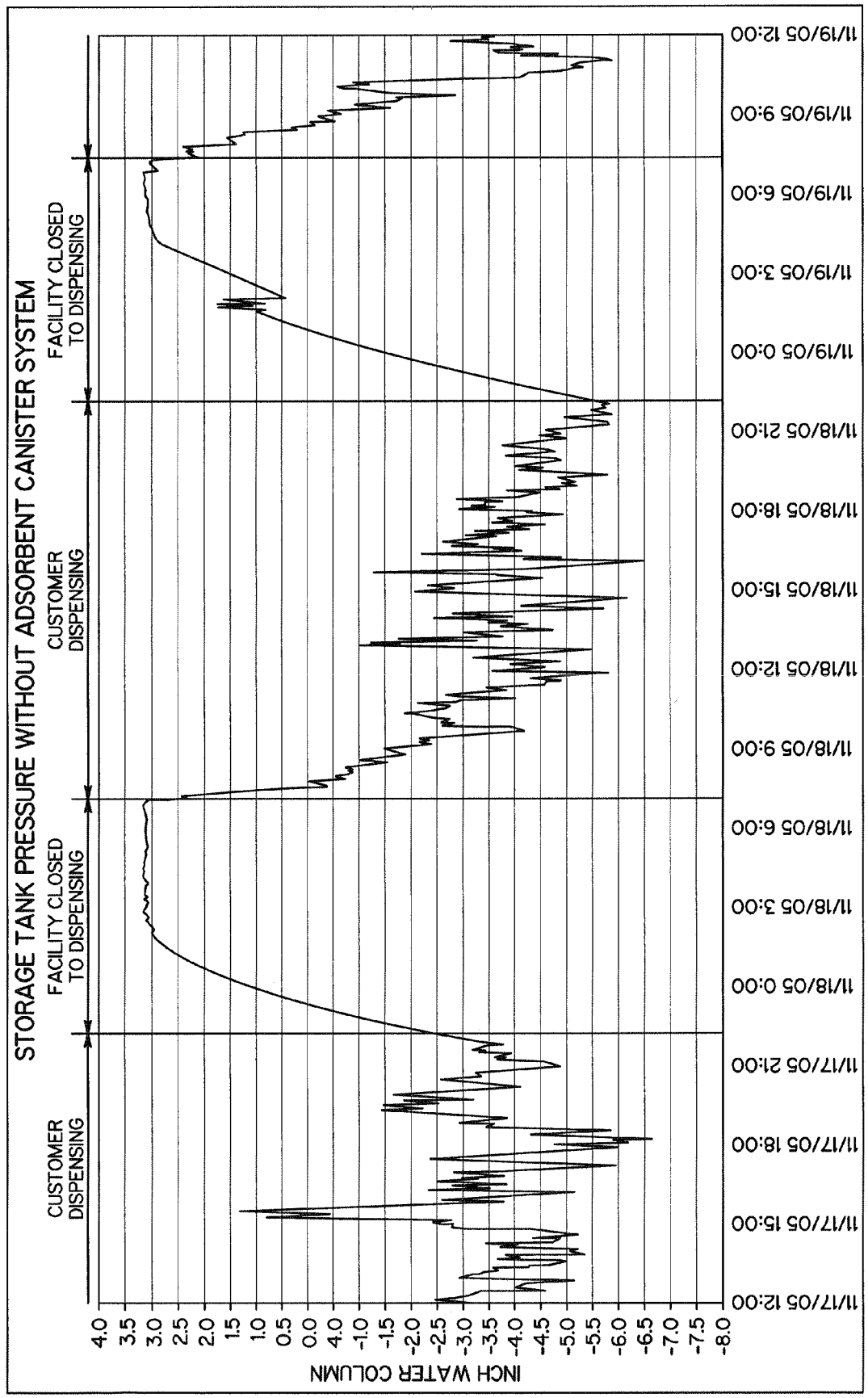
FIG. 3 is a chart showing pressures occurring in a vapor recovery system with no filter.

Referring now to FIG. 3, that FIG. Comprises a chart which illustrates, for comparative purposes, a dispensing history of dispensing events (vehicle fuelings) over a 48 hour period where system 10 of the invention is not used. FIG. 3 illustrates vapor growth during non-dispensing times, i.e. from about 9 or 10 in the evening to about 7 or 8 a.m. the next day. When the facility is closed to dispensing, vapor pressure growth exceeds a level of +3.0 inches, thus cracking any system vents and dumping unfiltered hydrocarbons to the atmosphere. And negative pressure can reduce to lower than about −2.0 inches, increasing air intake into the system through pressure relief vents.

Figure 4:
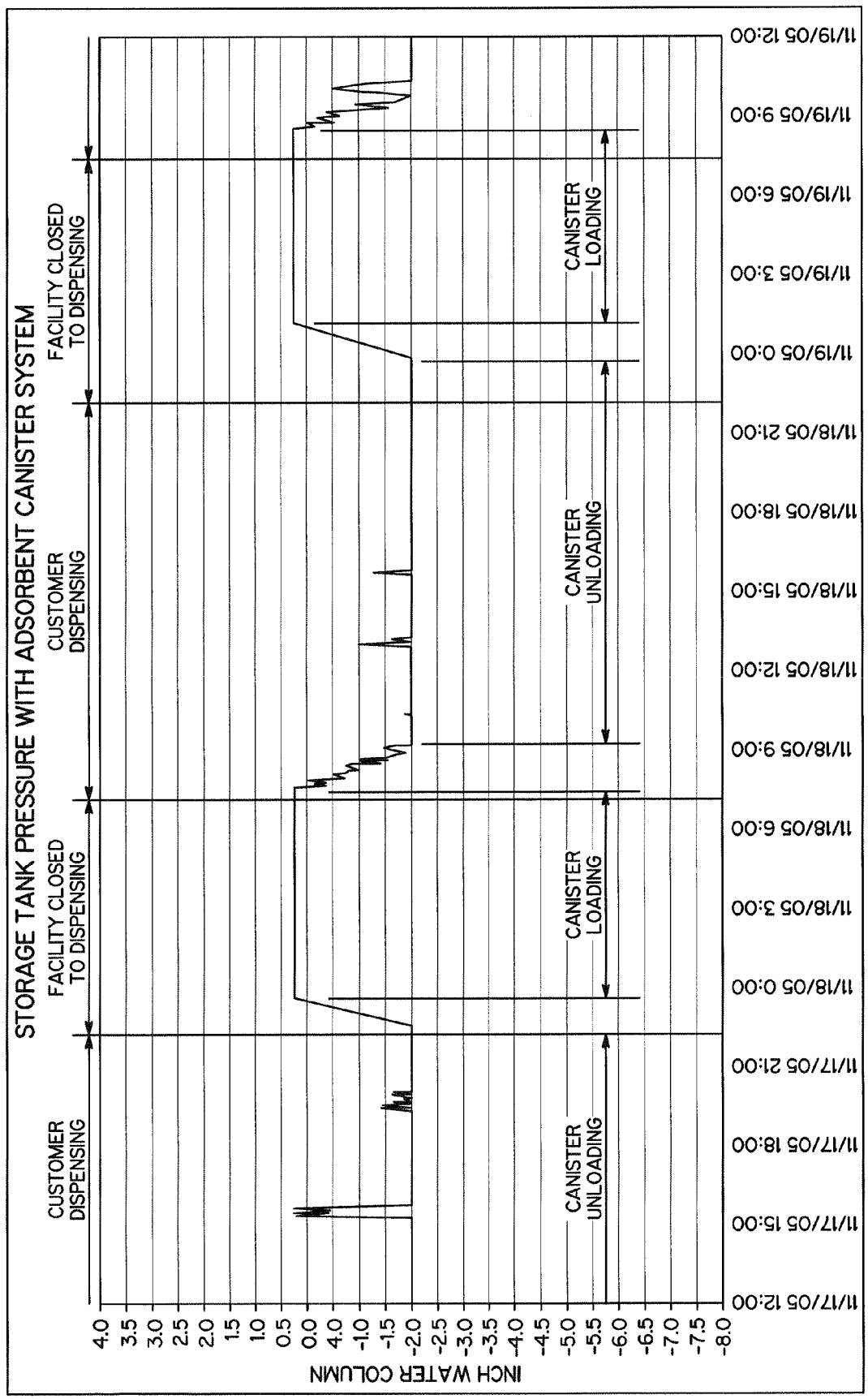
FIG. 4 is a chart similar to FIG. 3 but showing pressure levels occurring in a system according to the invention.

Turning to system 10 according to the invention shown in FIG. 1 and operationally illustrated in FIG. 4, the system cycles the single filter 17 between filtering and unloading states.

When dispensing stops or significantly slows, the pressure in the gasoline storage tank will rise. This typically occurs at night.

The high sensor 25 continuously monitors storage tank pressure. When the pressure in the storage tank exceeds the preset limit, the canister solenoid valve 27 is opened by the control panel 26. This allows any further growth in the storage tank 13 to vent through the canister 17. The adsorbent material in the canister 17 allows the cleaned or filtered air portion of the volume to pass through the canister and vent to atmosphere while the hydrocarbon portion of the volume is loaded onto the adsorbent material. Typically, the set point limit for this higher pressure is slightly above local atmospheric pressure. This is done so any growth in the tank that would cause pressure and fugitive emissions is controlled. FIG. 4 shows an example where the high pressure is set at approximately +0.20 inch of water column.

When the customer dispensing begins again, the net negative volume exchange with the vehicles again draws the storage tank pressure in area 40 into a vacuum. The low pressure sensor 26 also continuously monitors the storage tank 13 pressure. When the pressure in the storage tank 13 falls below the preset limit, the canister solenoid valve 27 is opened by the control panel 20. This allows atmospheric air to be drawn in to the storage tank 13 through the canister 17 and vent line 18. As fresh air is passed through the canister 17 which contains adsorbed hydrocarbon, the hydrocarbons are removed and returned to the storage tank 13. The cleaning or regenerating of the adsorbent material allows for the adsorbent material to be substantially free of hydrocarbon before the next loading cycle begins. FIG. 4 shows an example where the low pressure sensor is set at approximately −2.0 inch of water column. An extra benefit of this unloading process is that with hydrocarbon returning to the storage tank 13 with the ingested air, less total air is drawn in which results in less evaporation and pressure growth during the next idle time and loading cycle.

In the event that during a loading cycle, the adsorbent material of filter 17 becomes substantially filled, hydrocarbon will begin to exhaust from the canister 17 to the atmosphere through vent line 18. The exhaust hydrocarbon sensor 28 is continuously monitoring the effluent of the canister 18 and when a hydrocarbon concentration exists in the effluent in excess of the hydrocarbon sensor preset threshold, an audible and/or visual alarm will sound, and the solenoid valve 27 will be closed and not allowed to open even upon a high pressure sensing at sensor 25 until the system 10 is reset. This stops all flows out of the canister 17 to the environment. But, when this alarm condition exists, the control panel 20 will continue to allow the low pressure sensor 26 to open the solenoid valve 27 so the adsorbent material can be unloaded of hydrocarbon.

As above noted, typical adsorbent material canister emission control systems employ at least two canisters. This allows simultaneous loading of one canister and unloading of a second canister. The invention of the currently disclosed system 10 allows the adsorbent system to use only a single canister. This is accomplished by controlling the pressure swing in the storage tanks to definite and separate intervals; loading and unloading occur in a series instead of a parallel. As a result, cost and complexity of additional canisters is eliminated, as is the cost and complexity of an active vapor assist or vacuum system.

While the foregoing has discussed one invention embodiment primarily with a balance nozzle, as noted, an assist-type nozzle could be used with system 10. Such an assist nozzle may or may not make a tight vapor seal to the vehicle fill neck, but has a vacuum source to pull air/vapor from the vehicle during dispensing. When filling an ORVR vehicle, the assist nozzle will sense the presence of the ORVR equipped vehicle and reduce the air/vapor flow returned to the gasoline storage tank by one of the following methods: measuring pressure or vacuum in the vehicle gasoline tank, measuring the hydrocarbon concentration in the air/vapor flow to the storage tank or other means. This again will result in a reduction in volume in the gasoline storage tank and will tend the pressure in said tank to reduce below local atmospheric pressure. With the gasoline storage tank below local atmospheric pressure, no gasoline vapor emissions from said tank will occur.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A passive gasoline vapor treating system including;
    a hydrocarbon filter apparatus interconnected to a fuel tank having a range of vapor pressures therein over time, said filter apparatus configured to receive and load hydrocarbon vapors from said tank in response to one vapor pressure in said fuel tank, said filter apparatus being in direct fluid communication with the atmosphere and configured to deliver air from the atmosphere, and hydrocarbon vapor, to said tank in response to another vapor pressure in said tank lower than said one vapor pressure for unloading said filter, said filter configured to operate between hydrocarbon loading and hydrocarbon unloading cycles independently of any other hydrocarbon removal apparatus, the passage of air through said filter being in direct response to said vapor pressures; and a valve operatively coupled to a pressure sensor, wherein the valve is configured to be opened when the pressure sensor senses a sufficiently low pressure to enable air to flow from the atmosphere to the fuel tank via the filter.

2. A system as in claim 1 further including a hydrocarbon monitor operably connected to an outlet from said filter on an opposite side of said filter from its connection to said tank.

3. Apparatus for passively filtering hydrocarbon vapor in storage tank of a fuel, said apparatus including:
a storage tank;
a fuel dispenser interconnected to said tank for dispensing fuel therefrom and for passing hydrocarbon vapor back to said tank during said dispensing;
an exhaust passage from said tank to atmosphere;
a hydrocarbon filter in said exhaust passage operably interconnected directly to said tank for receiving hydrocarbon vapor from said tank at an upstream side of said filter, said filter being directly connected to and communicating with atmosphere at a downstream, opposite side of said filter;
at least a first pressure sensor for sensing vapor pressure upstream of said filter;
a vapor valve operatively positioned between said atmosphere and said tank; and
a control for operating said valve in response to said sensing of vapor pressure, said control being operable to open said valve for flow of air through said filter in an upstream direction when the at least first pressure sensor senses a pressure that is below a predetermined value to unload said filter of hydrocarbon.

4. Apparatus as in claim 3 including a second pressure sensor for also sensing vapor pressure upstream of said filter, said first sensor for sensing a higher vapor pressure and said second sensor for securing a lower vapor pressure, said valve being open upon sensing vapor pressure below about −2.0 inches water column and upon sensing vapor pressure above about 0.20 inches water column.

5. The system of claim 1 further comprising a second pressure sensor operatively coupled to the valve, wherein the second pressure sensor is configured to open the valve when the second pressure sensor senses a sufficiently high pressure in the fuel tank to enable hydrocarbon vapor to flow from the tank to the filter apparatus.

6. The system of claim 1 wherein said valve is configured to generally be closed, blocking the flow of air and vapor between said tank and said filter, when said pressure sensor does not sense said sufficiently low pressure.

7. The system of claim 1 wherein said sufficiently low pressure sensed by said pressure sensor is pressure in said tank or in an area in direct fluid communication with said tank.

8. Apparatus for filtering hydrocarbon vapor in a storage tank for a fuel, said apparatus consisting of:
a storage tank;
a fuel dispenser interconnected to said tank for dispensing fuel therefrom and for passing hydrocarbon vapor through passages back to said tank during said dispensing;
an exhaust passage from said tank to atmosphere;
a single hydrocarbon filter operably connected between said tank and said atmosphere in said exhaust passage for receiving hydrocarbon vapor from said tank at an upstream side of said filter solely in response to one vapor pressure in said tank;
an opposite outlet from said filter, communicating directly with atmosphere, at a downstream side of said filter;
at least a first pressure sensor for sensing vapor pressure upstream of said filter;
a vapor valve between said tank and said filter,
a control for operating said valve in response to said sensing of vapor pressure upstream of said filter;
said control being operable to open said valve for flow of air through said filter in an upstream direction when said sensor senses a second lower vapor pressure when fuel is dispensed from said tank and to unload said filter of hydrocarbon, and for flow of hydrocarbon vapor through said filter to said atmosphere from said tank upon sensing said first vapor pressure when fuel is not being dispensed to load said filter with hydrocarbon and thereby remove hydrocarbon from said hydrocarbon vapor emanating from said tank.

9. A passive gasoline vapor treating system comprising:
a hydrocarbon filter interconnected to a fuel tank having a range of vapor pressures therein over time, said filter configured to receive and load hydrocarbon vapors from said tank in direct response to one vapor pressure in said fuel tank, said filter being in direct fluid communication with the atmosphere for delivering air from the atmosphere, and hydrocarbon vapor, to said tank in response to another vapor pressure in said tank lower than said one vapor pressure for unloading said filter, said filter being configured to pass hydrocarbon vapor and air between hydrocarbon loading and hydrocarbon unloading cycles independently of any other hydrocarbon removal apparatus, said filter being operative to remove hydrocarbon vapor from fluid flowing in one direction from said tank to atmosphere and to introduce air and hydrocarbon from said filter to said tank to unload hydrocarbon from said filter to said tank, upon fluid flowing in an opposite direction, and in the absence of any other filters and of any pumps; and a valve operatively coupled to a pressure sensor, wherein the valve is configured to be opened when the pressure sensor senses a sufficiently low pressure to enable air to flow from the atmosphere to the fuel tank via the filter.

10. A passive gasoline vapor treating system including:
a hydrocarbon filter apparatus interconnected to a fuel tank having a range of vapor pressures therein over time and coupled to the atmosphere, said filter apparatus configured to receive and load hydrocarbon vapors from said tank for one vapor pressure in said fuel tank, said filter apparatus configured to deliver air from the atmosphere, and hydrocarbon vapor, to said tank responsive to another vapor pressure in said tank lower than said one vapor pressure for unloading said filter, said filter configured to operate in hydrocarbon loading and hydrocarbon unloading cycles without reference to any other hydrocarbon removal apparatus; and a valve operatively coupled to a pressure sensor, wherein the valve is configured to be opened when the pressure sensor senses a sufficiently low pressure to enable air to flow from the atmosphere to the fuel tank via the filter.

11. A system as in claim 10 wherein fluid passes in opposite directions through said filter solely in response to vapor pressure differentials on respective sides of said filter apparatus.

12. A system as in claim 10 which consists of only one said single filter apparatus.

13. Apparatus for filtering hydrocarbon vapor in storage tank of a fuel, said apparatus including:
- a storage tank;
- a fuel dispenser interconnected to said tank for dispensing fuel therefrom and for passing hydrocarbon vapor back to said tank during said dispensing;
- an exhaust passage from said tank to atmosphere;
- a hydrocarbon filter in said exhaust passage operably interconnected directly to said tank for receiving hydrocarbon vapor from said tank at an upstream side of said filter, said filter being directly connected to and communicating with atmosphere, at a downstream side of said filter;
- at least a first pressure sensor for sensing vapor pressure upstream of said filter;
- a vapor valve operatively positioned between said atmosphere and said tank; and
- a control for operating said valve in response to said sensing of vapor pressure; said control being operable to open said valve for flow of air through said filter in an upstream direction when the at least first pressure sensor senses a pressure that is below a predetermined value.

* * * * *